United States Patent [19]

Fukuda et al.

[11] 4,111,811
[45] Sep. 5, 1978

[54] APPARATUS FOR COLLECTING EFFLUENT OIL

[75] Inventors: Shozo Fukuda; Yajuro Seike, both of Nagasaki; Masafumi Iizuka, Koganei; Hironao Kasai; Mamoru Enami, both of Nagasaki, all of Japan

[73] Assignee: Mitsubishi Jukogyo Kabushiki Kaisha, Tokyo, Japan

[21] Appl. No.: 780,351

[22] Filed: Mar. 23, 1977

[30] Foreign Application Priority Data

Apr. 1, 1976 [JP] Japan .................................. 51-37647

[51] Int. Cl.$^2$ ........................ B01D 37/00; E02B 15/04
[52] U.S. Cl. .......................... 210/242 S; 210/DIG. 25
[58] Field of Search ........ 210/83, 84, 242 S, DIG. 25

[56] References Cited

U.S. PATENT DOCUMENTS

| | | | |
|---|---|---|---|
| 3,812,968 | 5/1974 | Aramaki et al. | 210/242 S |
| 3,875,062 | 4/1975 | Rafael | 210/242 S |
| 3,909,417 | 9/1975 | Rafael | 210/242 S |
| 3,951,810 | 4/1976 | Crisafulli | 210/242 S |
| 3,966,615 | 6/1976 | Petchcel et al. | 210/DIG. 25 |
| 4,033,869 | 7/1977 | McGrew | 210/242 S X |

Primary Examiner—Charles N. Hart
Assistant Examiner—Robert H. Spitzer
Attorney, Agent, or Firm—Wenderoth, Lind & Ponack

[57] ABSTRACT

Improved apparatus for collecting effluent oil floating on a water surface. The improvements exist in that the apparatus utilizes a pair of side plates disposed in a forwardly opened arrangement, a weir which is inclined in a rear-downward direction with its opposite side edges contacted to the inner wall surfaces of the side plates under the water surface, and a slant plate which has its rear end positioned above the rear end of the weir in the rear of said side plates and has its opposite side edges fixedly secured to the inner wall surfaces of the side plates. Also, an oil leakage preventing plate is positioned midway between the rear end of the weir and the rear end of the slant plate and has its opposite side edges fixedly secured to the inner wall surfaces of the side plates to form a water discharge port between the oil leakage preventing plate and the rear end of the weir and to form an oily water intake port between the oil leakage preventing plate and the rear end of the slant plate. An oily water intake pipe communicates with the oily water intake port, and a float is mounted directly or indirectly to said side plates. In addition, wave buffering chambers are positioned above the slant plate and the intake port to help absorb the kinetic energy of wave action forced against the intake port.

2 Claims, 11 Drawing Figures

APPARATUS FOR COLLECTING EFFLUENT OIL

BACKGROUND OF THE INVENTION

The present invention relates to an apparatus for effectively inducing and collecting effluent oil floating on a water surface with a suction pump.

Heretofore, for this purpose various apparatuses have been proposed, but every apparatus in the prior art had a disadvantage in that under high wave conditions its oily water intake port was either raised above the oil layer on the water surface or sank under the oil layer and thereby the oil collecting efficiency was lowered extremely. In addition, with highly viscous oil, adhesion of the oil to the various parts of the oil collecting apparatus was remarkable, and resulted in difficulty in suctioning the oil with a pump, and furthermore, if the oil layer were thin, the oil collecting efficiency was very low.

SUMMARY OF THE INVENTION

One object of the present invention is to provide an improved apparatus for collecting effluent oil that is free from the abovementioned disadvantages.

According to one feature of the present invention there is provided an apparatus for collecting effluent oil characterized in that the apparatus comprises a pair of side plates disposed in a forwardly opened arrangement, a weir is provided and is inclined in a rear-downward direction with its opposite side edges contacted to the inner wall surfaces of the side plates under a water surface. A slant plate is disposed with its rear end positioned above the rear end of the weir in the rear of the side plates and has its opposite side edges fixedly secured to the inner wall surfaces of the side plates. An oil leakage preventing plate is positioned midway between the rear end of the weir and the rear end of the slant plate and has its opposite side edges fixedly secured to the inner wall surfaces of the side plates to form a water discharge port between the oil leakage preventing plate and the rear end of the weir and to form an oily water intake port between the oil leakage preventing plate and the rear end of the slant plates. Also, an oily water intake pipe communicates with the oily water intake port, and a float or floats are mounted directly or indirectly to the side plates.

BRIEF DESCRIPTION OF THE DRAWING

The above-mentioned and other features and objects of this invention will become more apparent by reference to the following description taken in conjunction with the accompanying drawings, in which:

FIG. 1 being a plan view,

FIG. 2 being a side view,

FIG. 3 being a cross-section view taken along line III—III in FIG. 2, and FIG. 4 being a cross-section view taken along line IV—IV in FIG. 1.

DETAILED DESCRIPTION OF THE INVENTION

Figure 1:
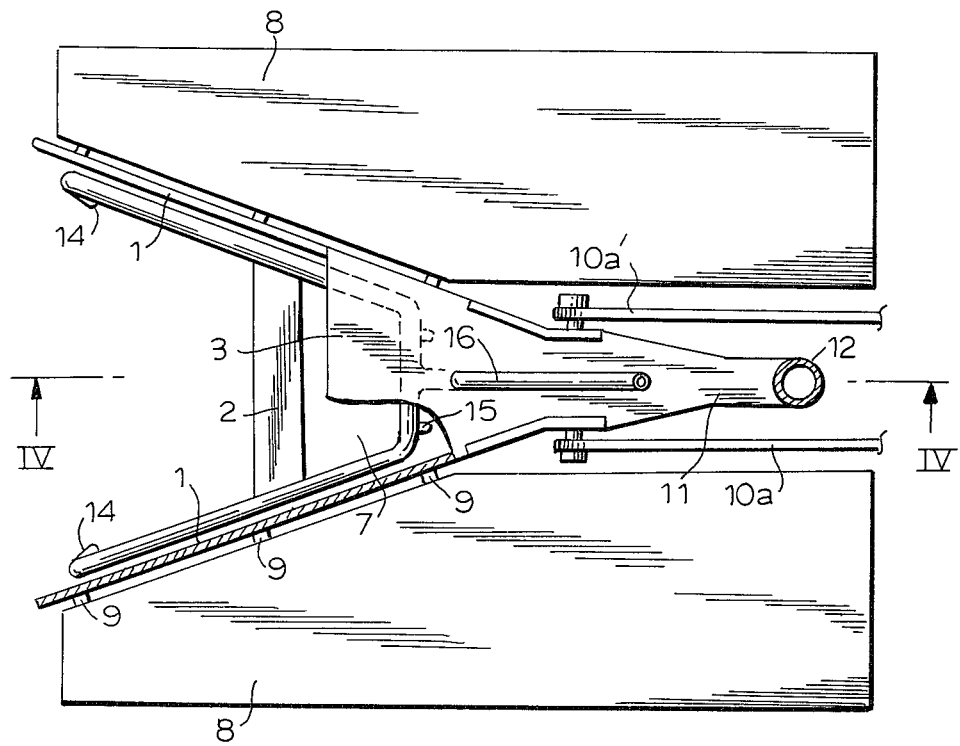
FIGS. 1 to 4 show a first preferred embodiment of the present invention.
Figure 2:
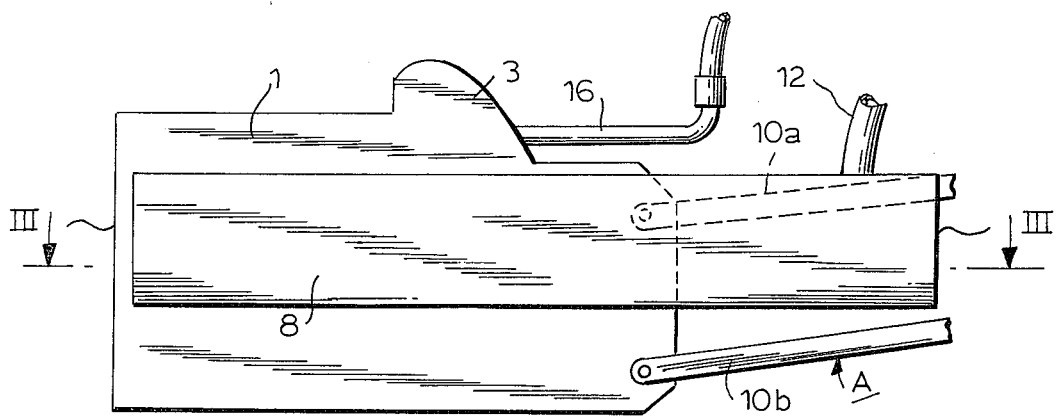
Figure 3:
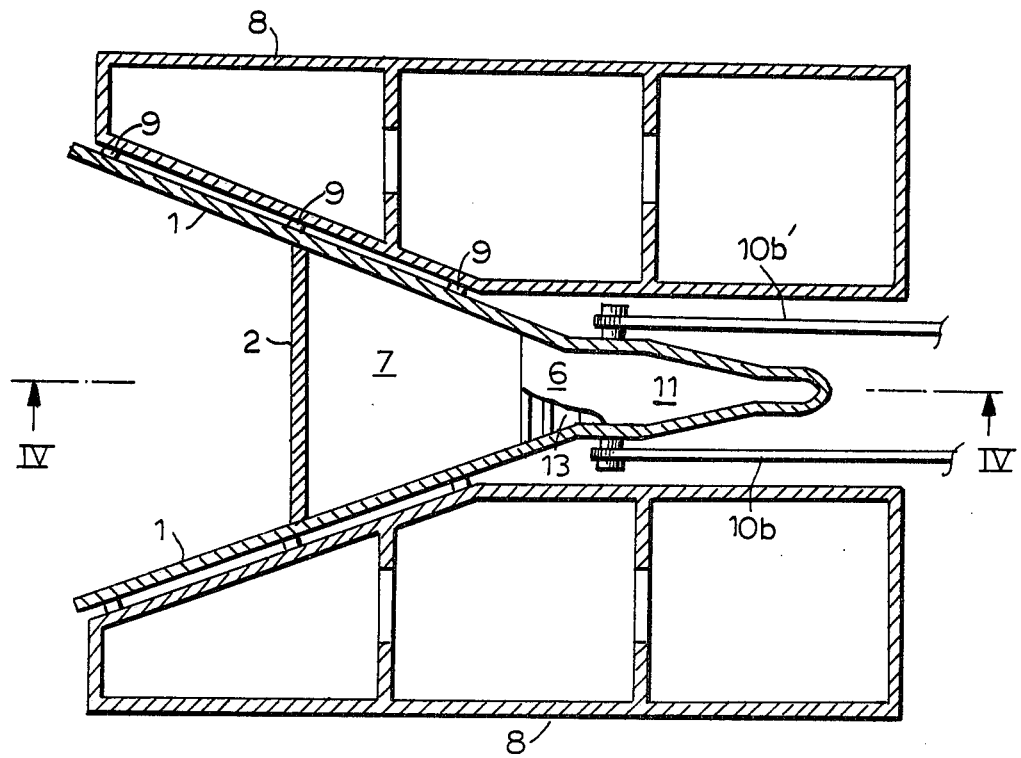

Referring now to FIGS. 1 to 4, reference numeral 1 designates a pair of side plates disposed in a forwardly opened (the left in these figure being the front side) arrangement, and numeral 2 designates a weir plate inclined in the rear-downward direction with its rear edge directed vertically and having its opposite side edges fixedly secured to the inner wall surfaces of the pair of side plates 1 underneath the surface of the water. A a slant plate 3 is disposed so that its front end may come to the center portions of the upper edges of the side plates, and its rear end may come to the rear of the side plates its opposite side edges are fixedly secured to the inner wall surfaces of the side plates. The front end portion of the slant plate 3 is bent downwardly. An oil leakage preventing plate 4 is disposed between the rear end of the weir plate 2 and a rear end of the slant plate 3, and its opposite side edges are fixedly secured to the inner wall surfaces of the side plates 1. A water discharge port 5 is formed between the oil leakage preventing plate 4 and the rear end of the weir plate 2, while an oily water intake port 6 of bell-mouth shape is formed between the oil leakage preventing plate 4 and the rear end of the slant plate 3. A space delimited by the pair of side plate 1, weir plate 2, slant plate 3 and oil leakage preventing plate 4 forms an oil pool 7. Reference numeral 8 designates a pair of floats, which are formed in a hollow water-tight box shape and are mounted to the opposite outer side walls of the left and right side plates 1 by means of coupling members 9. The weight and dimensions of these floats 8 are selected so as to minimize the ratio of weight to water line area and to position their center of buoyancy in the vicinity of the oily water intake port 6. Reference character A designates a parallel linkage mechanism in which two pairs of link rods 10a, 10b, 10'a and 10'b having equal lengths and disposed parallel to each other have their front ends pivotably mounted at the upper and lower portions, respectively, of the rear ends of the side plates 1, and their rear ends pivotably supported on members of a vessel (not shown) for operating this effluent oil collecting apparatus. Reference numeral 11 designates an oily water intake pipe, the front end of which forms the oily water intake port 6 that opens towards the oil pool 7, and the other end of which is communicated through a flexible pipe 12 and a pump (not shown) to a tank in the operation vessel. A check valve 13 is provided at the water discharge port 5. Reference numerals 14 and 15 designate jet water nozzles. The former nozzles 14 are provided on the inside of the side plates at their front portions and are directed in the rear-downward direction; the latter nozzles 15 are provided just in front of the slant plate 3 and are also directed in the rear-downward direction. Numeral 16 designates a jet water supply pipe for supplying pressurized water to the jet water nozzles 14 and 15; numeral 17 designates sea water; and numeral 18 designates an oil layer floating on the sea water 17.

Now description will be made on the operation and advantage of the subject apparatus. An oil collecting head including the side plates 1, weir plate 2, slant plate 3, oil leakage preventing plate 4 and oily water intake pipe 11, floats on the water surface owing to the floats 8, and although the oil collecting head may move up and down due to variation of the amount of water or waves within the oil pool 7, it is allowed only to translate with its direction relative to the hull of the operating vessel always kept constant, because it is connected to the hull by means of the two pairs of link rods 10a, 10b, 10'a, and 10'b having an equal length and disposed in parallel to each other. Accordingly, even when the water surface is waving, it would never occur that only the oil collecting head is subjected to pitching at a relatively high frequency, but it would be inclined always by the same angle as the hull of the operation vessel having a large inertia. In addition, since the ratio of weight to water line area of the floats 8 is small and since the center of buoyancy is positioned in the vicinity of the oily water intake port 6, the relative water level in the vicinity of the oily water intake port 6 would be varied little, even when the oil collecting head is rocking.

When the operation vessel navigates leftwardly as viewed in FIGS. 1 to 4, the oil collecting head also moves leftwardly, so that the sea water 17 having an oil layer 18 floated thereon can be collected by the forwardly opened side plates 1, and flows into the oil pool 7 beyond the weir plate 2. Then, owing to the jet water ejected backwardly from the jet water nozzles 14, the oil is fluidized to promote the inflow of the oily water, and also adhesion of the oil onto the side plates 1 can be prevented.

Figure 4:
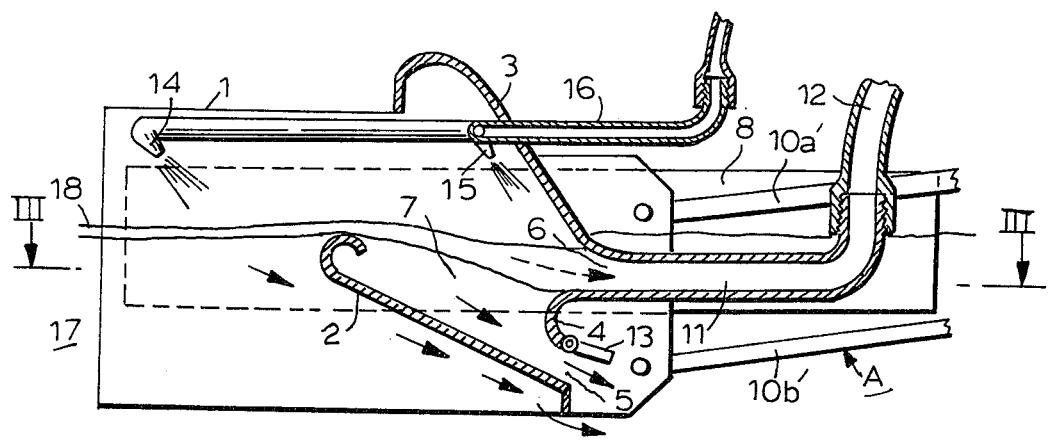
Figure 5:
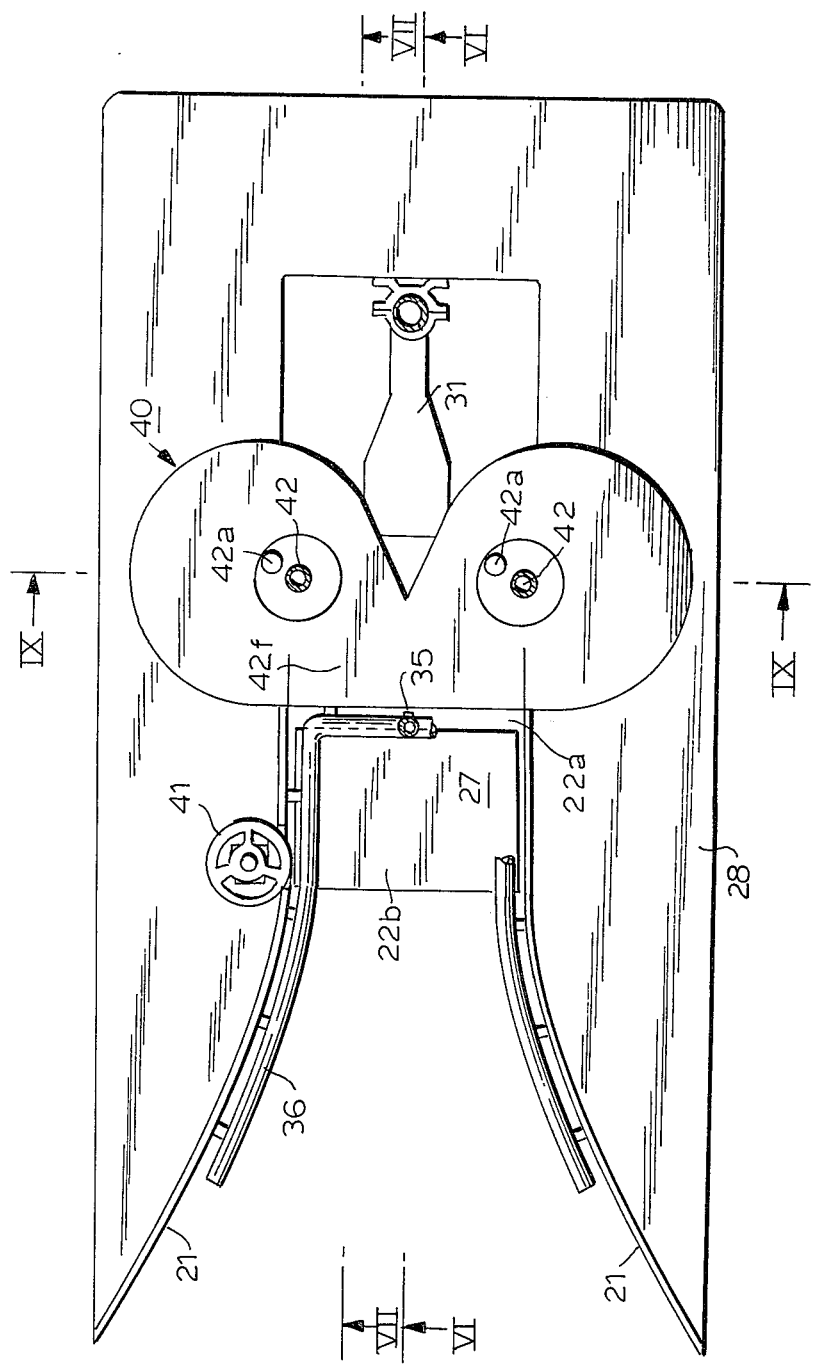
FIGS. 5 to 11 show a second preferred embodiment of the present invention, FIG. 5 being a plan view, FIG. 6 being a longitudinal cross-section side view along line VI—VI in FIG. 5, FIG. 7 being a longitudinal cross-section side view taken along line VII—VII in FIG. 5, FIG. 8 being a transverse cross-section view taken along line VIII—VIII in FIGS. 6 and 7, FIG. 9 being a transverse cross-section view taken along line IX—IX in FIGS. 5 to 7, FIG. 10 being a longitudinal cross-section plan view taken along line X—X in FIGS. 6 to 9, and FIG. 11 being a longitudinal cross-section plan view taken along line XI—XI in FIGS. 6 to 9.
Figure 6:
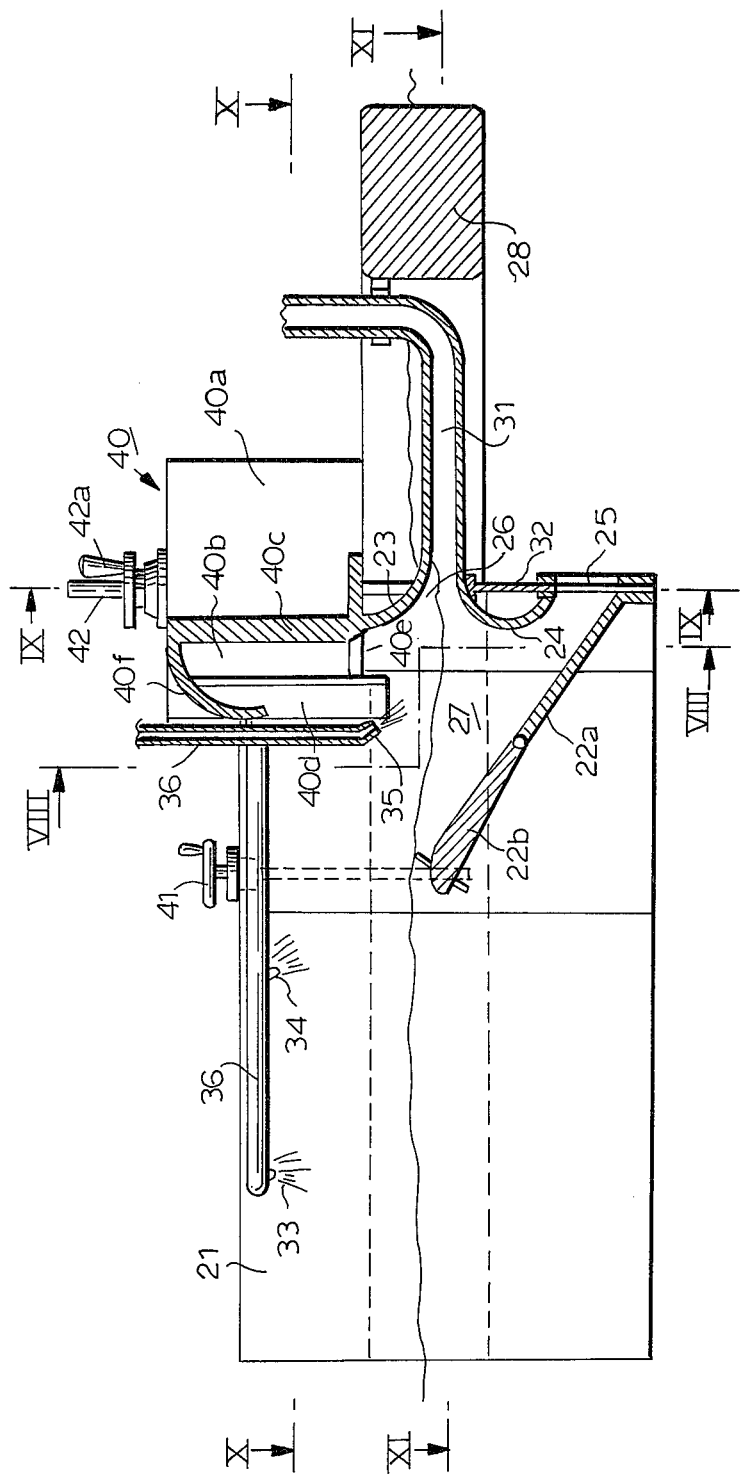
Figure 7:
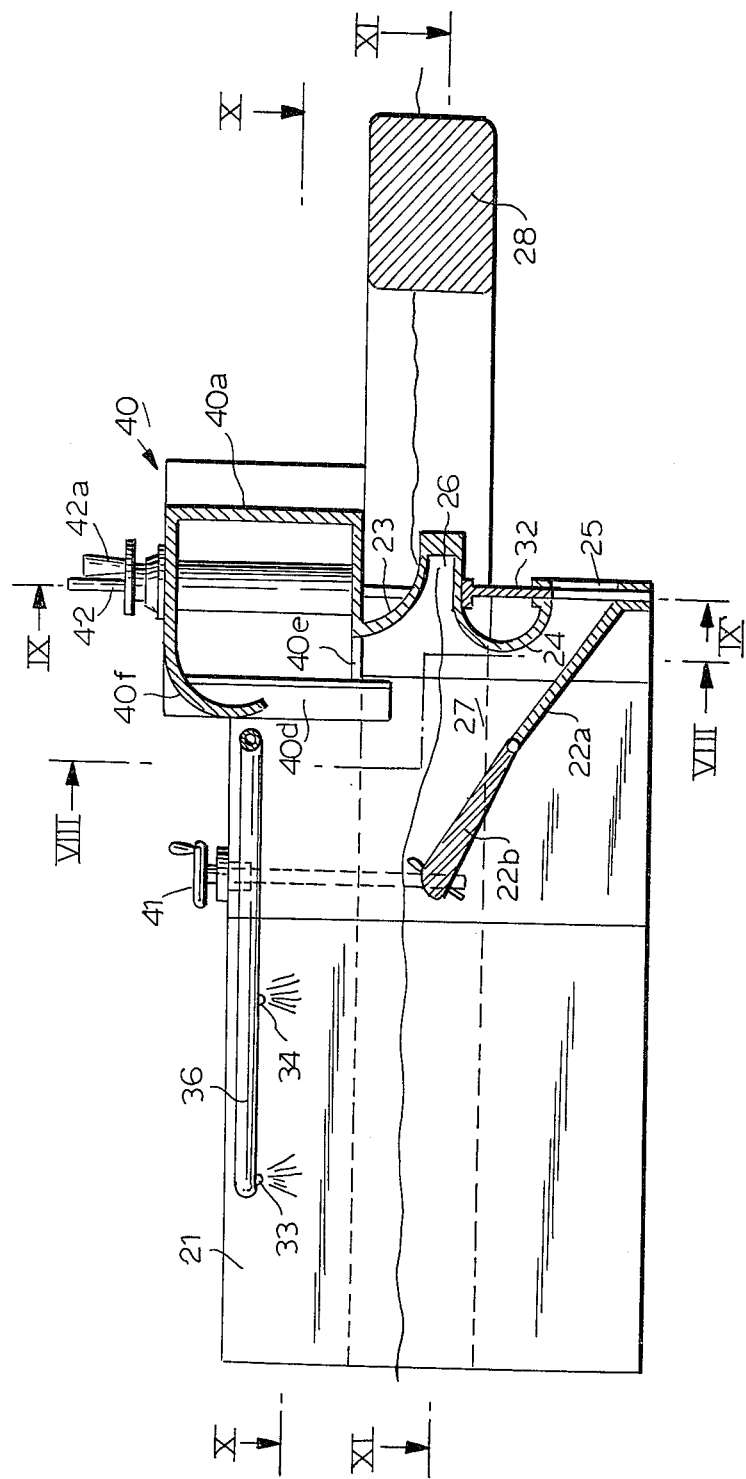
Figure 8:
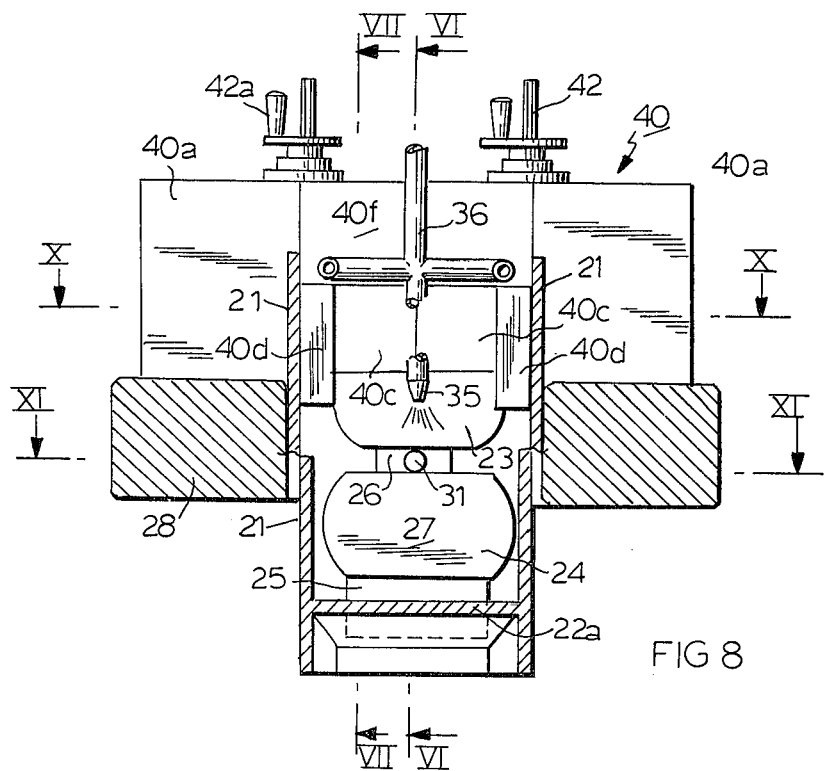
Figure 9:
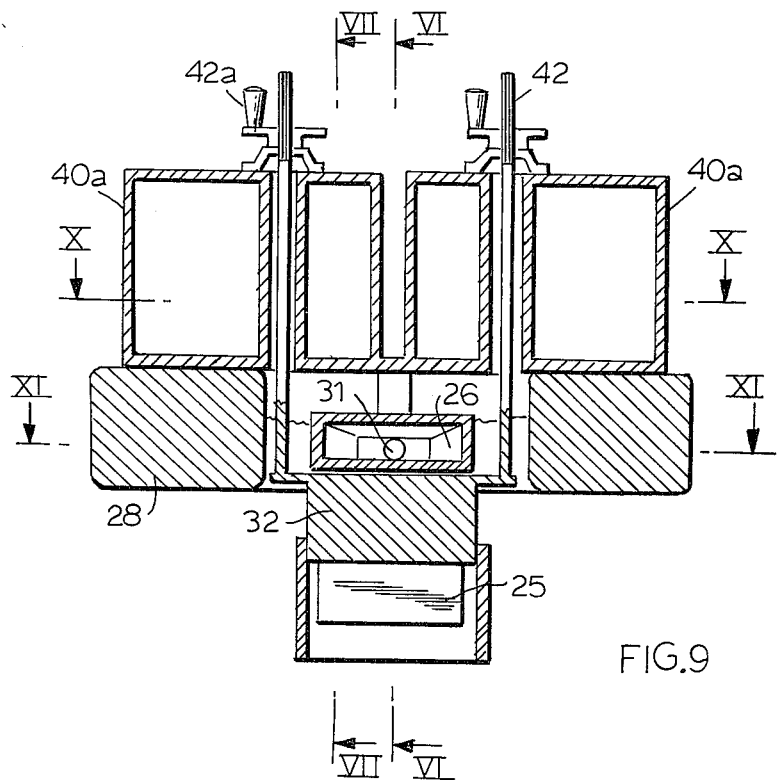
Figure 10:
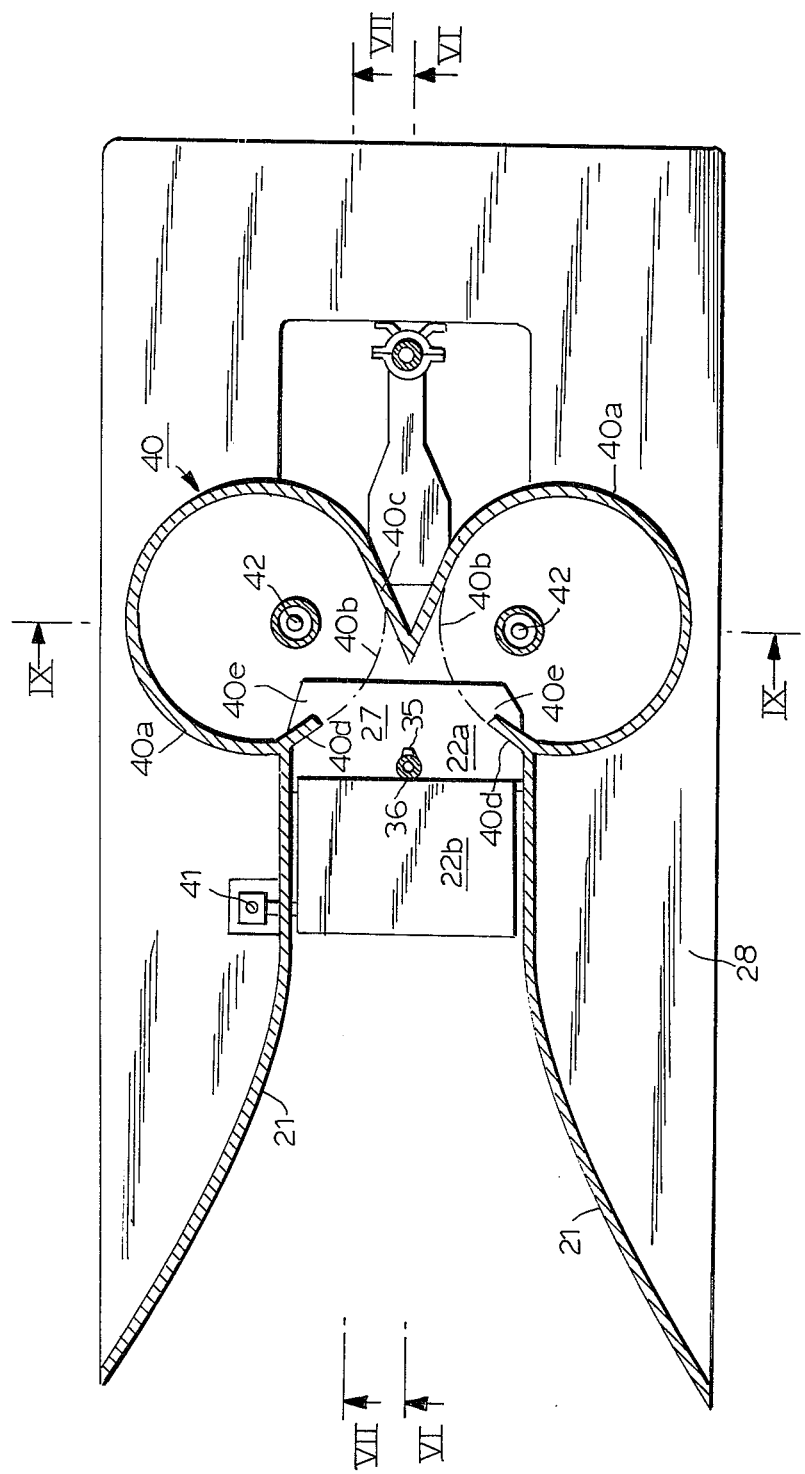
Figure 11:
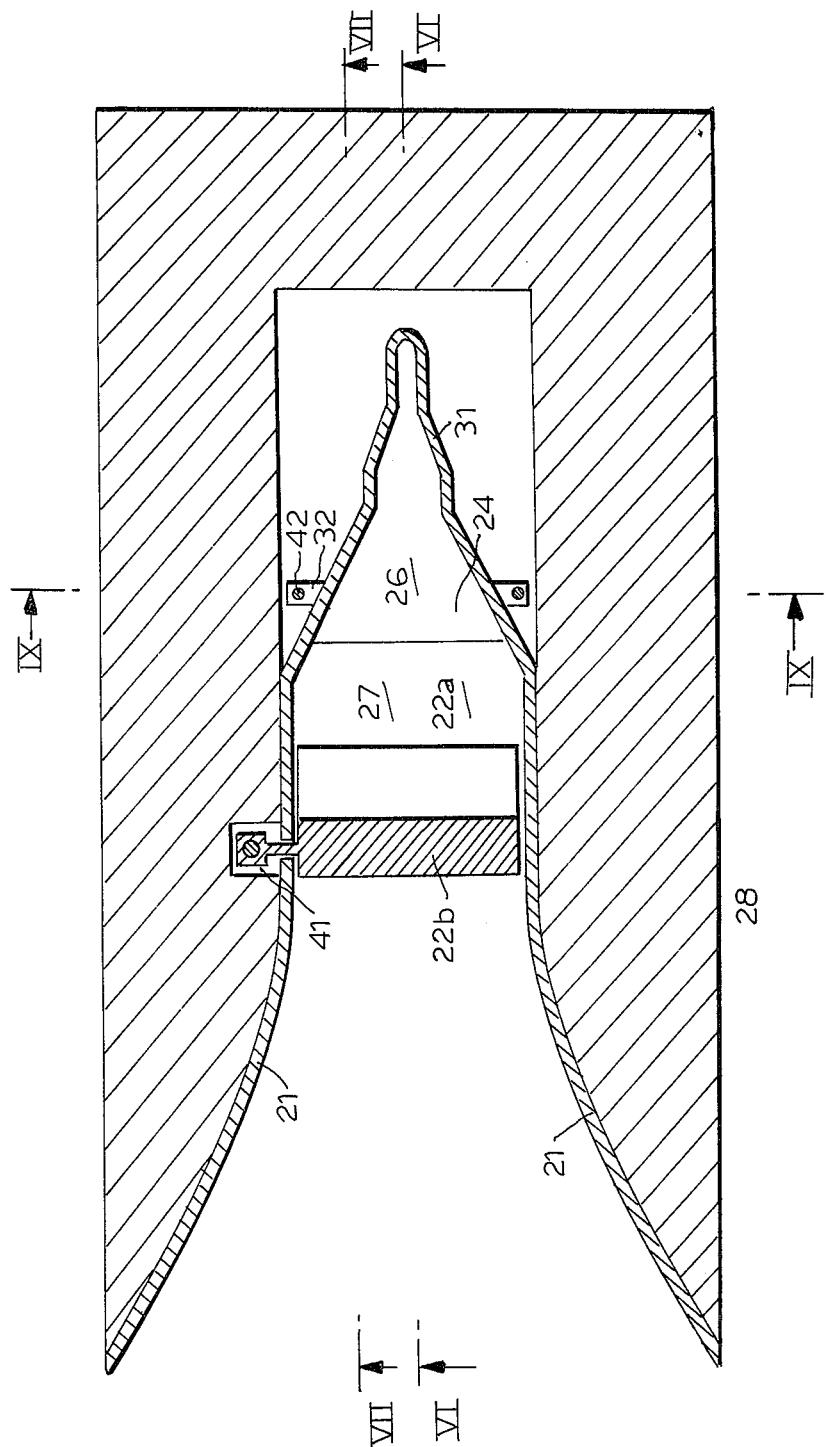

The oil collected together with sea water in the oil pool 7 and condensed into a thick layer is collected in a tank on the vessel through the oily water intake port 6 and the oily water intake pipe 11 by means of a pump not shown, as represented by a dash-line arrow in FIG. 4. At this time, the oil is fluidized by the jet water ejected from the jet water nozzles 15, and thereby blocking of the oily water intake port 6 caused by highly viscous oil and adhesion of the oil onto the wall surface can be prevented.

On the other hand, the sea water 17 in the lower layer is discharged externally through the water discharge port 5. In this case, since the rear edge portion of the weir plate 2 is directed vertically, the sea water flowing along the lower surface of the weir plate 2 is accelerated when making a detour around this vertical portion, resulting in lowering of a pressure, so that the sea water in the water pool 7 can be sucked and outflow of the sea water through the water discharge port 5 can be promoted.

Whenever the operation vessel and thus the oil collecting head is stopped while continuing the suction of oily water by the pump, the pressure in the oil pool 7 is lowered. However, in such case, the check valve 13 operates effectively to prevent back flow of the sea water through the water discharge port 5 into the oil pool 7, and only the sea water 17 containing the oil layer 18 flows into the oil pool 7 beyond the weir plate 2.

In addition, even when a large amount of oily water flows momentarily flow into the oil pool 7 beyond the weir plate 2 due to waves and surges upon the oily water intake port 6, the excessive oily water will not leak out since it is blocked by the slant plate 3. The water is led upwards along the slant plate 3 and returns into the oil pool 7 owing to the bent portion at the front end of the slant plate.

Nextly, a second preferred embodiment of the present invention will be described with reference to FIGS. 5 to 11. In these figures, reference numeral 21 designates a pair of side plates disposed with their front portions opened forwardly, middle portions arranged in parallel to each other and rear portions closed together backwardly. Reference numeral 22a designates a fixed weir plate having its opposite side edges fixedly secured to the inner wall surfaces of the side plates 21 at their lower rear portions and inclined in the rear-downward direction with its rear edge portion directed vertically, and numeral 22b designates a movable weir plate having its rear edge pivotably supported about a horizontal axis at the front edge of the fixed weir plate 22a. Reference numeral 23 designates a backwardly lowering slant plate that is somewhat curved, and the opposite side edges of the slant plate 23 are fixedly secured to the inner wall surfaces of the side plates 21 at their rear end portions. Reference numeral 24 designates an oil leakage preventing plate which is disposed between the rear end of the fixed weir plate 22a and the slant plate 23. The opposite side edges of the oil leakage preventing plate 24 are fixedly secured to the inner wall surfaces of the side plates. Between the rear end of the fixed weir plate 22a and the plate 24 is a water discharge port 25, while between the slant plate 23 and the plate 24 is an oily water intake port 26 of bell-mouth shape. A space delimited by the pair of side plates 21, weir plate 22, slant plate 23 and oil leakage preventing plate 24 forms an oil pool 27. Reference numeral 28 designates a U-shaped float, whose front yoke portions are fixedly secured to the opposite outer side walls of the left and right side plates, respectively, and are jointly connected at their rear ends. Reference numeral 31 designates an oily water intake pipe, the front end of which forms the oily water intake port 26 opening towards the oil pool 27, and the rear end of which is communicated with a tank on an operation vessel through a flexible pipe and a pump, not shown. Reference numeral 32 designates a sluice valve provided at the water discharge port 25. Reference numerals 33, 34 and 35 designate jet water nozzles. The the foremost pair of nozzles 33 are provided on the inside of the front portions of the side plates 21 and are directed downwardly. The center pair of nozzles 34 is provided on the inside of the center portions of the side plates 21 and is directed downwardly and somewhat backwardly. The rearmost port is provided above the center portion of the oil pool 27 and is directed somewhat backwardly. Reference numeral 36 designates a jet water supply pipe for supplying pressurized water to these jet water nozzles 33, 34 and 35. Reference numeral 40 designates a pair of left and right wave buffer chambers, which have a generally cylindrical form with their opposite ends closed and their side walls 40a partly cut away as shown at 40b in FIG. 10, and which are disposed above the slant plate 23 with their center axes directed vertically and the cut away openings 40b opposed to each other. Integral with the side walls 40a, a breakwater plate 40c having an inverse-V-shaped cross-section projects forwardly from the rear ends of the cut away openings 40b. At the front edges of the cut away portions 40b, the side walls of the pair of wave buffer chambers 40 extend backwardly and downwardly inside of the side plates 21 as shown at 40d, and in the bottom plates of the extended portions are notches 40e. In addition, the top plates of the pair of wave buffer chambers 40 are connected integrally, and at the middle position between the both wave buffer chambers the front edge 40f of the top plates is curved downwardly. Reference numeral 41 designates a weir height adjusting device which is provided in the vicinity of the front edge of the movable weir plate 22b. Numeral 42 designates a sluice valve actuator that is mounted to the sluice valve 32 and extends through the wave buffer chambers 40. Handle 42a are mounted to the top portions of the actuator.

With regard to the operation and advantage of the abovedescribed second preferred embodiment, they are substantially similar to those of the first preferred embodiment, except for the point that in this second embodiment the weir plate is severed into a fixed weir plate 22a and a movable weir plate 22b and the height of the front edge of the movable weir plate 22b is adjustable by means of the weir height adjusting device 41, so that the inflow rate of the oily water into the oil pool 27 can be controlled by appropriately adjusting the height of the weir depending upon the thickness of the oil layer, the speed of the vessel, the suction capability of the pump, etc.

In addition, since the wave buffer chambers 40 are provided, even when that a large amount of oily water flows momentarily into the oil pool 27 beyond the movable weir 22b due to waves and strikes against the oily water intake port 26 or thereabout the excessive oily water is at first severed by the breakwater plate 40c into the left and right halves, which are introduced into the respective wave buffer chambers 40 through the cut away openings 40b of the side walls 40a. The introduced oily water revolves along the inner surface of the side wall 40a, and after it has been given a backward speed component by the extended portion 40d of the side wall, it falls through the notches 40e of the bottom plates towards the oil pool 27 and the oily water intake port 26. In addition, the oily water having jumped up to the top plate of the wave buffer chamber 40 is also diverted by the curved portion at the front edge 40f of the top plate so as to be directed in the rear-downward direction and thus returned to the oil pool 27. In this way, the agitation phenomenon of the inflow water directed in the up and down directions and in the forth and back directions caused by striking of waves, can be mitigated, and the energy and reaction-forces are well offset, so that the collection of oil can be achieved efficiently even under a waved condition. It is to be noted that in the second embodiment, when the operation vessel is stopped, the reverse flow of sea water through the water discharge port 25 into the oil pool 27 can be prevented by closing the sluice valve 32 with the sluice valve actuator 42.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An apparatus for collecting effluent oil from the surface of a body of water, said apparatus comprising;
   a pair of side plates connected to each other with an open spaced arrangement at the forward end thereof;
   a weir conected to the inside surfaces of said side plates beneath the water level of said body of water, said weir being inclined in a rear-downward direction;
   a slant plate secured to the rear inner wall surfaces of said side plates above said weir, the rear portion of said slant plate being positioned above the rear of said weir;
   an oil leakage preventing plate secured to the inner surfaces of said side plates midway between the rear portion of said weir and the rear portion of said slant plate, whereby a water discharge port is formed between said weir and said oil leakage preventing plate and an oily water intake port is formed between said rear portion of said slant plate and said oil leakage preventing plate;
   an oily water intake pipe connected to said oily water intake port;
   float means connected to said side plates for floating said side plates in said body of water; and
   wave buffering means above and in front of said oily water intake port and between said side plates in communication with said water between said side plates for receiving said water which surges toward said oily water intake port due to wave action of said body of water and subsequently returning said water between said side plates, whereby the kinetic energy of said wave action is absorbed by said buffering means, said wave buffering means comprised of:
   at least one pair of vertical cylindrical wave buffer chambers above said slant plate and said oily water intake port, each chamber having a vertical cutaway opening thereinto in the side portion thereof, said openings substantially opposing each other,
   a substantially v-shaped breakwater plate integrally formed with said chambers at the rearward edges of said opposed openings and projecting forward therefrom, whereby said chambers are joined together,
   side wall plates on the forward edges of said openings extending backwardly and downwardly between said side plates, and
   a single top plate covering both of said chambers, said top plate being curved downwardly at the forward edge thereof in front of said openings.

2. An apparatus as claimed in claim 1, further comprising:
   a plurality of jet water nozzle means in front of and on the inside of said side plates and in front of said slant plate and directed in a rear-downward direction for supplying pressurized water against said water between said side plates and said slant plate.

* * * * *